United States Patent [19]
Motz et al.

[11] Patent Number: 5,108,559
[45] Date of Patent: Apr. 28, 1992

[54] PROCESS FOR PURIFYING HYDROGEN FLUORIDE

[75] Inventors: Kaye L. Motz, Ponca City, Okla.; Francisco J. Freire, Wilmington, Del.; Eileen G. Edwards, Ponca City, Okla.

[73] Assignee: E. I. Du Pont de Nemours and Company, Wilmington, Del.

[21] Appl. No.: 591,125

[22] Filed: Oct. 1, 1990

[51] Int. Cl.⁵ .................................. C01B 7/22
[52] U.S. Cl. ........................ 204/96; 204/140; 423/484
[58] Field of Search ............ 203/31; 423/484; 204/140, 96

[56] References Cited

U.S. PATENT DOCUMENTS

| | | | |
|---|---|---|---|
| 2,742,415 | 4/1956 | Lawrence et al. | 204/130 |
| 3,166,379 | 1/1965 | Bradley et al. | 23/153 |
| 3,663,382 | 5/1972 | Garris | 203/91 |
| 3,687,622 | 8/1972 | Garris | 423/406 |
| 3,689,370 | 9/1972 | Haruhana et al. | 203/31 |
| 4,032,621 | 6/1977 | Meadows | 634/488 |
| 4,083,941 | 8/1978 | Jayawant et al. | 423/488 |
| 4,144,158 | 3/1979 | Nagasubramanian et al. | 204/182.2 |
| 4,491,570 | 1/1985 | Wheaton et al. | 423/484 |
| 4,668,497 | 5/1987 | Miki | 423/484 |
| 4,756,899 | 7/1988 | Jenczewski et al. | 423/483 |
| 4,954,330 | 9/1990 | Ziegenhain | 423/484 |

FOREIGN PATENT DOCUMENTS

| | | | |
|---|---|---|---|
| 4325135 | 10/1968 | Japan | 423/484 |
| 0990874 | 1/1983 | U.S.S.R. | 204/96 |

OTHER PUBLICATIONS

Lehms et al. Chemical Abstract vol. 109, 76171W.

*Primary Examiner*—John Niebling
*Assistant Examiner*—Arun S. Phasge
*Attorney, Agent, or Firm*—Robert B. Stevenson

[57] ABSTRACT

A process for manufacturing high purity anhydrous hydrogen fluoride (HF) having low levels of oxidizable impurities by electrolytically oxidizing the impurities. Specifically, trivalent arsenic impurity in the anhydrous hydrogen fluoride is oxidized to a non-volatile pentavalent arsenic compound. The resultant solution is distilled to recover high purity anhydrous hydrogen fluoride with low levels of arsenic impurity.

11 Claims, No Drawings

PROCESS FOR PURIFYING HYDROGEN FLUORIDE

BACKGROUND OF THE INVENTION

1. Field of the Invention

This invention relates to the manufacture of high purity anhydrous hydrogen fluoride with low levels of oxidizable impurities. More specifically but not by way of limitation, this invention deals with a manufacturing process which involves oxidizing the volatile trivalent arsenic impurity to a non-volatile arsenic pentavalent compound using alternating current in an electrolytic cell. The resulting mixture is distilled to recover high purity anhydrous hydrogen fluoride with very low levels of arsenic, water and other oxidizable impurities.

2. Description of the Related Art

Anhydrous hydrogen fluoride is formed by heating a mixture of fluorspar and sulfuric acid. The main impurities in the prepared hydrogen fluoride are flurosulfonic acid, silicon tetrafluoride, sulfur dioxide, sulfuric acid and water. These impurities are usually removed by fractional distillation, and the resulting anhydrous hydrogen fluoride has a purity of about 99.8% or better. However, the anhydrous hydrogen fluoride thus obtained still contains unacceptable quantities of undesirable impurities such as arsenic. The amount of arsenic impurity which is present in the anhydrous hydrogen fluoride depends on the amount of arsenic-bearing impurities in the fluorspar used to prepare the anhydrous hydrogen fluoride.

The anhydrous hydrogen fluoride generally contains about 20 to 600 part per million (ppm) of arsenic impurity. The presence of this impurity at these levels is undesirable for many applications. Anhydrous hydrogen fluoride is extensively used as a fluorinating agent in the production of organic and inorganic chemicals, and in the refining of metals. The presence of arsenic impurities in the anhydrous hydrogen fluoride can poison catalysts, contaminate products and cause severe equipment corrosion.

Several processes have been proposed to remove arsenic impurities from anhydrous hydrogen fluoride. Among these are processes which involve multiple fractional distillation. However, such methods are not considered to be economical for producing commercial quantities.

For example, in U.S. Pat. No. 3,687,622 the distillation of impure anhydrous hydrogen fluoride containing 1200 ppm As at very high pressures (e.g., >115 psia and preferably >165 psia) is disclosed wherein the As is removed overhead and purified hydrogen fluoride (e.g., <3,000 ppb and preferably <100 ppb As) is recovered as bottoms product. In U.S. Pat. No. 3,663,382 As impurities are removed from anhydrous hydrogen fluoride by distillation at a pressure below 25 psia with purified hydrogen fluoride being recovered as the overhead product.

Most of the processes disclosed in the art to reduce arsenic levels in anhydrous hydrogen fluoride involve oxidation of trivalent arsenic to pentavalent arsenic thereby to reduce its volatility.

For example, U.S. Pat. No. 3,166,379 discloses a method whereby high purity aqueous hydrogen fluoride is produced by treatment with an oxidizing agent, such as permanganate, persulfate, or chlorate salts together with a halogen, preferably iodine, to convert arsenic impurities to non-volatile compounds. This process is suitable for the purification of aqueous hydrogen fluoride but suffers from the drawback of possible contamination with volatile manganese compounds when anhydrous hydrogen fluoride is distilled from the aqueous solution.

A solution to this problem is claimed in U.S. Pat. No. 3,689,370 which describes a process involving the addition of an inorganic ferrous salt to the anhydrous hydrogen fluoride after the permanganate or dichromate treatment to reduce excess oxidizing agents. However, this process results in a high level of iron contamination.

The iron contamination problem is solved in U.S. Pat. No. 4,032,621 which describes a process involving the addition of a heavy-metal-free reagent, such as hydrogen peroxide, to anhydrous hydrogen fluoride after the permanganate or dichromate treatment to reduce excess oxidizing agent. This process is very sensitive and may not be convenient for continuous operation.

In East German Patent No. 62,309 Jun. 20, 1968 the removal of arsenic from 80-90% aqueous hydrogen fluoride with 30% hydrogen peroxide ($H_2O_2$) at 40°-60° C. is disclosed. The reference also teaches that arsenic removal from anhydrous hydrogen fluoride can be accomplished by continuously adding anhydrous hydrogen fluoride and hydrogen peroxide solution of suitable concentration to the reactor maintained at 80-90% hydrogen fluoride and 40°-60° C. The reactor contents are distilled and absorbed in water to produce a purified aqueous solution of HF. This process is limited to production of aqueous solutions of HF product and is not suitable for the manufacture of purified anhydrous hydrogen fluoride.

U.S. Pat. No. 4,083,941 claims removal of arsenic and sulfite impurities from anhydrous hydrogen fluoride by the addition of 0.7% $H_2O_2$ and 0.6% methanol at 0°-75° C. or by the addition of at least 2.3% by weight of persulfuric acid ($H_2SO_5$) based on anhydrous hydrogen fluoride. But this procedure has the disadvantage of introducing a foreign material to the process.

U.S. Pat. No. 4,491,570 claims arsenic removal from anhydrous hydrogen fluoride by treating with hydrogen chloride or a fluoride salt, or both, and then separating purified anhydrous hydrogen fluoride by distillation from the non-volatile arsenic compounds. Again, this process has the potential of introducing a foreign material into purified anhydrous hydrogen fluoride.

U.S. Pat. No. 4,668,497 discloses a process involving the addition of fluorine to oxidize impurities present in hydrogen fluoride followed by distillation. This process requires the hydrolysis of remaining fluorine after distillation.

U.S. Pat. No. 4,756,899 claims arsenic removal from anhydrous hydrogen fluoride by treating with hydrogen peroxide in the presence of a catalyst, which is comprised of molybdenum or an inorganic molybdenum compound, and a phosphate compound followed by distillation. Again, this process has the potential of introducing foreign material into the purified anhydrous hydrogen fluoride.

In a co-pending and commonly assigned U.S. patent application Ser. No. 07/487,437, a method of purifying anhydrous hydrogen fluoride using an electrolysis process is described and claimed. This method involved the use of a pair of inert electrodes immersed in anhydrous hydrogen fluoride to pass an effective amount of direct current through the anhydrous hydrogen fluoride to oxidize substantially all trivalent arsenic impurities to pentavalent arsenic. The resulting solution is then distilled and the anhydrous hydrogen fluoride with reduced levels of arsenic impurities being recovered as the distillate. The present invention is viewed as an improvement and extension of this previous method wherein it has been discovered that an effective amount of alternating current can be employed to oxidize the trivalent arsenic to the pentavalent state irregardless of the logical conclusion that reversal of polarity at the electrodes would merely result in reduction of the newly formed pentavalent state back to the trivalent arsenic. U.S. patent application Ser. No. 07/487,437 is incorporated herein by reference as further describing the electrolytic purification of anhydrous hydrogen fluoride.

SUMMARY OF THE INVENTION

In accordance with this invention, a process for manufacturing high purity anhydrous hydrogen fluoride with low levels of arsenic impurities is provided which does not introduce foreign material into the final product, and which is adaptable for continuous operation. The process involves passing an effective amount of alternating current through the anhydrous hydrogen fluoride containing trivalent arsenic impurities at a temperature and for a period of time sufficient to electrolytically oxidize the volatile, difficult-to-separate trivalent arsenic impurity in the anhydrous hydrogen fluoride to non-volatile pentavalent arsenic compounds. Apparently the pentavalent arsenic produced by oxidation of the trivalent arsenic during that portion of the alternating current cycle wherein the electrode serves as the anode is immediately stabilized in the anhydrous hydrogen fluoride solvent (perhaps, but not by way of limitation, as the $AsF_6-$ complex or the like). Consequently, during that portion of the alternating current cycle wherein the same electrode serves as the cathode, mere reversal (i.e., chemical reduction) of the pentavalent arsenic back to the trivalent state is not the prevailing or dominant electrode reaction. Thus the net result of the alternating current according to the present invention is the production of pentavelent arsenic at both electrodes. The resulting solution is then distilled, and high purity anhydrous hydrogen fluoride with reduced levels of arsenic impurities is recovered.

Thus the present invention provides a process for purifying anhydrous hydrogen fluoride comprising the steps of:

a. passing an effective amount of alternating current through anhydrous hydrogen fluoride containing trivalent arsenic impurities to oxidize substantially all of said trivalent arsenic to pentavalent arsenic; and b. distilling the resulting solution, thus recovering anhydrous hydrogen fluoride with reduced levels of impurities.

It is an object of the present invention to provide a cost effective method of purifying anhydrous hydrogen fluoride which does not introduce foreign material into the final product, and which is adaptable for continuous operation. It is a further object of the present invention to provide a method of electrolytically oxidizing volatile trivalent arsenic impurities in anhydrous hydrogen fluoride to a non-volatile pentavalent arsenic compound such that purified anhydrous hydrogen fluoride can be recovered by distillation. Fulfillment of these objects and the presence and fulfillment of other objects will be apparent upon complete reading of the specification and attached claims.

DESCRIPTION OF THE PREFERRED EMBODIMENTS

The method of manufacturing high purity anhydrous hydrogen fluoride according to the present invention involves passing an effective amount of an alternating current through liquid-phase anhydrous hydrogen fluoride. In principle, this is accomplished by applying a direct current voltage across a pair or pairs of electrodes immersed in the liquid anhydrous hydrogen fluoride present in an electrolytic cell or the like while simultaneously controlling the voltage. During the electrolysis the volatile trivalent arsenic impurities are electrolytically oxidized to non-volatile pentavalent arsenic compounds. The reaction product (more specifically, the liquid reaction medium) can then be fed to a distillation column or the like (as generally known in the art). The high purity anhydrous hydrogen fluoride containing considerably reduced levels of arsenic impurities can then be withdrawn from the top of the column as the desired product. A waste stream containing high levels of arsenic impurities (non-volatile pentavalent arsenic compounds; e.g., $HAsF_6$) is withdrawn from the bottom of the distillation column. Thus, according to the present invention, substantially all arsenic impurities are removed from the anhydrous hydrogen fluoride without the addition of oxidizing chemicals or catalysts.

For purposes of this invention, the electrolytic reaction that converts the trivalent arsenic to the pentavalent arsenic can be viewed as proceeding according to the following electrochemical reactions:

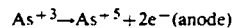

$$As^{+3} \rightarrow As^{+5} + 2e^- \text{(anode)}$$

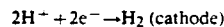

$$2H^+ + 2e^- \rightarrow H_2 \text{(cathode)}$$

Although the possible concomitant production of elemental fluorine at the cathode could be expected at higher voltage drops and certainly will occur at very high voltage drops, it has been found that no significant amount of elemental fluorine is generated as a result of the present process even at higher voltages and current.

Electrolytic oxidation and/or reduction normally requires the use of direct current so that the anode and cathode can be identified. Usually isolation of the electrodes is required to prevent reversal of the desired reaction. In contrast and according to the present invention, it has been discovered that $AS^{+3}$ can be oxidized to $As^{+5}$ in an electrolytic cell using alternating current. Further according to the present invention, the initial product of the electrolytic oxidation apparently further reacts with the solvent HF to form a very stable species. For example but again not by way of limitation, the formation of the hexafluoroarsenate anion, $AsF_6-$, or the like, represents a "trapping reaction" or "trapping event" that takes place at the electrode. Consequently and at least under the same conditions at which oxidation has just taken place, the reverse reduction of $As^{+5}$ back to $As^{+3}$ during the subsequent reduction (cathode) cycle of the alternating current is substantially blocked and inhibited. As such, each electrode can be either an anode or a cathode or sequentially oscillate back and forth (i.e., use of alternating current) and the desired reaction will still take place.

The electrolysis reaction according to the present invention is preferably carried out at conditions that favor the oxidization of the trivalent arsenic and minimizes the electrolysis of hydrogen fluoride that would result in the formation of undesirable fluorine. However it should be appreciated that under certain circumstances the intentional production of elemental fluorine could be viewed as beneficial. For example, a series of sequential electrolytic cells could be employed wherein impure hydrogen fluoride passing through the sequential series is initially treated with a less than stoichiometric amount of fluorine (relative to the amount of $As^{-3}$ present) rapidly produced at higher voltages such as to oxidize most of the $As^{+3}$ followed by a carefully controlled final electrolytic cell operated at conditions that oxidize the remaining $As^{+3}$ with out substantial production of fluorine. Such a sequential system could, in principle, reliably handle hydrogen fluoride containing high levels of $As^{+3}$ impurities.

According to the present invention, electrical current flow is present at as low as 0.85 volts indicating that desired electrolysis reactions are proceeding. Initially, the rate of reaction and the current increase linearly up to a plateau and then essentially level off with increasing voltage drop up to about 3.25 volts wherein the plot of current as a function of voltage drop increases dramatically in slope. From about 0.85 volts to about 3.25 volts the current efficiency approaches 100 percent indicating that the electrolysis is quantitative and free of side reactions. From about 3.25 volts up to at least 7.5 volts the desired electrolysis reaction will proceed rapidly with substantially no significant production of elemental fluorine, but the current efficiency decreases with increasing voltage drop. Although elemental fluorine may not be detected the presence of side reactions within this voltage range is suspected. Above 9 volts the electrolytic generation of elemental fluorine will be observed with significant fluorine being produced by the electrolysis of hydrogen fluoride above 10 volts. Thus, the useful voltage range for purposes of this invention is from about 0.85 volts to about 9.5 volts, and preferably between about 3.25 and 7.5 volts. At these voltages substantially all of the $As^{+3}$ is converted to $As^{+5}$ while simultaneously any impurities associated with phosphorous containing compounds, sulfur containing compounds, and/or water are either oxidized to a non-volatile compound or subjected to electrolysis and removed as off-gas at the electrodes. Consequently, the method of removal of arsenic impurities according to the present invention is also useful for simultaneously removing impurities associated with phosphorous containing compounds, sulfur containing compounds, and water.

Preferably, the rate of reaction can be increased (as exemplified later) by increasing the conductance of the hydrogen fluoride by the addition of electrolytes. The electrolytes should be either non-oxidizing electrolytes or electrolytes that produce, upon electrolysis, products that can readily be separated from the desired high purity anhydrous hydrogen fluoride by distillation. This would include, by way of example but not limited thereto; water, potassium fluoride or other alkali metal fluoride and mixtures thereof or the like.

Since the electrolysis step according to the present invention involves passing an effective alternating current between electrodes immersed in liquid hydrogen fluoride, the operating conditions must be such that liquid phase hydrogen fluoride is present. Consequently, the process is to be performed at a temperature range of from about $-20°$ C. to about $100°$ C., preferably from about $0°$ C. to about $50°$ C., and at an operating pressure sufficient to maintain liquid phase HF (i.e., from about 110 mmHg to about 8,000 mmHg). Typically a non-reactive or inert electrode as generally known in the art can be employed, preferably the electrodes are constructed of nickel or carbon.

In actual commercial practice, the reaction mixture will be distilled to obtain a high purity anhydrous hydrogen fluoride with low arsenic impurities. The distillation step can occur simultaneously (concurrently) or sequentially with the electrolysis step and can either involve a distillation column or a simple flash distillation unit as generally known in the art. Preferably, the distillation and/or the actual electrolysis will involve the use of an inert purge gas (as exemplified later) or sweep gas to remove any hydrogen co-product produced by virtue of the reduction reaction occurring during that portion of the alternating cyclic that the electrode serves as the cathode. Although the method according to the present invention is directed primarily to production of high purity anhydrous hydrogen fluoride containing low levels of arsenic impurity, it may also be used for the production of extremely high purity hydrogen fluoride for critical uses such as those required by the electronics industry.

The actual electrolysis cell and specifically the electrode configuration useful in the present invention can be any such device as generally known in the art including by way of example but not limited thereto; a convention flat plate design or an extended surface electrode design such as disclosed in U.S. Pat. No. 3,859,195.

The following examples are presented to further illustrate specific embodiments of the present invention and in particular the effectiveness of using electrolysis, with or without an electrolyte, to remove trivalent arsenic impurities from anhydrous hydrogen fluoride. In these examples an electrolytic cell was used which consisted of a cylindrical polyethylene vessel (3.5 inches in diameter and 3.5 inches in height) with a "TEFLON" cap, of approximately 250 ml maximum working capacity. Extending through the cap were cathode and anode electrode leads that terminated internally to the cell by operatively connecting to alternating members of a series of parallel square nickel plates spaced approximately $\frac{1}{8}$" apart and having an effective total surface area of 171 square centimeters. The cap of the cell was also provided with valved hydrogen fluoride inlet line, a nitrogen sweep gas inlet port, a reflux condenser outlet port and a thermocouple well. The electrolytic cell was placed in a liquid bath for cooling, and a reflux condenser at $-10°$ to $-20°$ C. along with 100 cc/min. flow of nitrogen was used to minimize losses and to isolate the cell from atmospheric moisture. A Variac was employed to adjust the voltage level of the 60 Hz alternating current. Volt and amp meters were connected to measure voltage and current consumption, respectively. The nitrogen sweep gas exiting the top of the condenser was directed to a potassium hydroxide scrubber. The examples used anhydrous hydrogen fluoride of at least 99.7% HF content manufactured from fluorspar containing between 100 and 300 parts per million of arsenic. The resultant hydrogen fluoride used was stated by the supplier as having the following nominal analytical values: 99.9478% HF; 14 ppm $SO_2$; 9 ppm NVA; 18 ppm $H_2O$; 12 ppm $H_2SiF_6$ and 469 ppm As. Separate analysis of the AHF to confirm the arsenic content of the starting material was performed. At the end of the electrolysis, the coolant flow to the reflux condenser was shut off, and vapor samples were collected for final arsenic analysis. All references to percentages and parts are by weight based on 100% HF unless otherwise specified.

EXAMPLES 1-5

A series of five runs using alternating current at various voltages and two different temperatures were performed. In each run the 250 ml electrolytic cell equipped with new nickel electrodes was charged with approximately 200 ml of anhydrous hydrogen fluoride. The respective starting concentrations of arsenic impurity before the electrolytic oxidation was determined for each run. The condenser refluxing the vapors over the electrolytic cell was kept at $-10°$ C. No alkali metal fluoride electrolyte was added to any of the runs. The temperature of the electrolytic cell for the first run was 0° C. while the remaining four runs were performed at 20° C. The voltage of the alternating electrical current was adjusted by use of a Variac and the current was allowed to flow for a specified amount of time. A sample of the liquid was then taken and analyzed. The process was repeated until the end of the run. At any time a sample of the vapor could also be taken by condensing it in a receiver. Data corresponding to the analysis before electrolytic oxidation and analysis of the liquid and condensed vapor after the electrolytic oxidation for the respective runs are presented in the following Table.

TABLE

| Run | Run Time (min.) | a.c. Volt. (v) | Temp. (°C.) | Starting As (ppm) | Cumm. Coulombs | Final As (ppm) in Vapor | % Conversion |
|---|---|---|---|---|---|---|---|
| 1 | 25 | 5 | 0 | 367 | 3,602 | 80 | 78 |
| 2 | 34 | 4 | 20 | 356 | 3,826 | 93 | 74 |
| 3 | 30 | 5 | 20 | 357 | — | 2 | 99 |
| 4 | 30 | 5 | 20 | 673 | 11,580 | 3 | 99 |
| 5 | 16 | 6 | 20 | 496 | 9,183 | 7 | 95 |

From the above data it can be seen that 99% conversion of the arsenic was achieved in 16 minutes at 6 volts a.c. To be sure that the removal of arsenic was not a physical phenomenon alone, samples of liquid HF were allowed to evaporate before treatment. The condensed vapor contained, within experiment error, the same amount of arsenic as that of the starting liquid sample.

Having thus described and exemplified the invention with a certain degree of particularity, it is to be understood that such details are solely for the purpose of illustration, and that many variations can be made without departing from the spirit and scope of the invention. Thus the following claims are not to be interpreted as being unduly limited, but are to be afforded a scope commensurate with the wording of each element of the claims and equivalents thereto.

What is claimed is:

1. A process for purifying anhydrous hydrogen fluoride consisting essentially of the steps of:
   (a) passing an effective amount of alternating current through anhydrous hydrogen fluoride containing trivalent arsenic impurities to oxidize substantially all of said trivalent arsenic to pentavalent arsenic; and
   (b) distilling the resulting solution, thus isolating and separating a residue enriched in arsenic impurities while simultaneously recovering anhydrous hydrogen fluoride distillate with reduced levels of impurities.

2. The process of claim 1 further comprising the step of adding of a non-oxidizable electrolyte to said anhydrous hydrogen fluoride containing trivalent arsenic impurities.

3. The process of claim 1 or 2 wherein the temperature is about $-20°$ C. to about 100° C.

4. The process of claims 1 or 2 wherein the temperature is about 0° C. to about 50° C.

5. The process of claim 1 or 2 wherein the voltage associated with said alternating current is between about 0.85 and about 10 volts.

6. The process of claim 1 or 2 wherein the voltage associated with said alternating current is between about 0.85 and about 9.5 volts.

7. The process of claim 1 or 2 wherein the voltage associated with said alternating current is between about 0.85 and about 3.25 volts.

8. The process of claim 1 or 2 wherein the voltage associated with said alternating currents is between about 3.25 and about 7.5 volts.

9. The process of claims 1 or 2 wherein the operating pressure is from about 110 mmHg to about 8,000 mmHg.

10. The process of claim 1 or 2 wherein said passing of alternating current is by electrodes constructed of nickel or carbon.

11. The process of claim 10 wherein the anode electrode is nickel.

* * * * *